United States Patent [19]

Tashiro et al.

[11] Patent Number: 4,809,197
[45] Date of Patent: Feb. 28, 1989

[54] ROAD SURFACE DETECTING DEVICE

[75] Inventors: Syuzaburou Tashiro, Okazaki; Toshikazu Ina, Nagoya; Hisasi Kawai, Toyohashi, all of Japan

[73] Assignee: Nippon Soken, Inc., Nishio, Japan

[21] Appl. No.: 945,953

[22] Filed: Dec. 24, 1986

[30] Foreign Application Priority Data

Dec. 26, 1985 [JP] Japan ................. 60-295542

[51] Int. Cl.$^4$ ................................. G01B 5/28
[52] U.S. Cl. ................... 364/550; 73/105; 73/146
[58] Field of Search ........... 364/424, 426, 550; 280/707; 303/105, 106; 73/105, 146; 324/166, 167, 170, 171

[56] References Cited

U.S. PATENT DOCUMENTS

| 3,888,118 | 6/1975 | Nims ........................ 73/105 |
| 4,355,364 | 10/1982 | Gudat ...................... 324/166 X |
| 4,422,322 | 12/1983 | Spangler .................. 73/105 |
| 4,506,909 | 3/1985 | Nakashima et al. ..... 280/707 |
| 4,616,848 | 10/1986 | Sugasawa et al. ....... 280/707 |
| 4,651,290 | 3/1987 | Masaki et al. ........... 73/105 X |
| 4,666,218 | 5/1987 | Masaki et al. ........... 303/106 |
| 4,670,852 | 6/1987 | Masaki et al. ........... 364/426 |
| 4,672,547 | 6/1987 | Masaki et al. ........... 364/426 |
| 4,674,050 | 6/1987 | Kubo ........................ 364/426 |

Primary Examiner—Gary Chin
Attorney, Agent, or Firm—Cushman, Darby & Cushman

[57] ABSTRACT

A road surface detecting device has a circular plate connected with an axle of a vehicle so as to be rotated with said axle, and has a large number of teeth at regular intervals in its outer periphery. A rotary sensor detecting the passage of the teeth of the circular plate, and generates a pulse signal, and a microcomputer receive the pulse signal. The microcomputer calculates instantaneous speeds of a wheel from the period of the pulse signal and calculates an average value of a plurality of instantaneous speeds obtained in the predetermined rotations of a wheel another average value of a plurality of instantaneous speeds obtained in the next predetermined rotations of a wheel is also calculated as a presumed speed of a vehicle based on one and another average values. The microcomputer then calculates an absolute value of a difference between the instantaneous speeds in the predetermined rotations after next of a wheel and the presumed speed of vehicle, cancels an absolute value of an oldest difference every time when an absolute value of a newest difference is obtained, and calculates a successive integrated value by adding absolute values of a predetermined number of differences to one another. The microcomputer determines the road surface condition to be a bad condition when the successive integrated value is not less than a predetermined value or as a good condition when the successive integrated value is not more than the predetermined value.

14 Claims, 6 Drawing Sheets

ROAD SURFACE DETECTING DEVICE

BACKGROUND OF THE INVENTION

1. Field of the Invention

The present invention relates to a road surface detecting device for detecting the condition of a road surface on which a vehicle is running.

2. Description of the Prior Art

When a vehicle runs on good roads or streets or the like, it is desired to absorb vibrations of small amplitude from the road surface by decreasing the damping force of a suspension of the vehicle conversely, and when a vehicle runs on bad roads such as mountain roads, it is desired to damp vibrations of large amplitude from a road surface, by increasing the damping force of the suspension of the vehicle.

In order to automatically control the damping force of the suspension as described above, a detecting device for detecting the condition of the road surface on which the vehicle runs is required. Such a detecting device has been proposed as a device for deciding the road condition from the variations of vehicle speed, that is from the acceleration or the deceleration of the vehicle (U.S. Pat. No. 4,506,909).

Since the variation of vehicle speed accurately corresponds to road conditions, the above described device exhibits excellent performance. However, the above described device has a problem. Namely, when a vehicle passes partially uneven portions on a good road, such as joints of a road, the variation of vehicle speed is temporarily increased. This results in the above described device erroneously interpreting these conditions as bad road conditions and erroneously increasing the damping force of a suspension of the vehicle. Consequently, the vehicle provides an uncomfortable ride.

Furthermore, when the air pressure of vehicle tires is changed over a large range and when the running speed of a vehicle is also changed, the acceleration or the deceleration is affected thereby. This results in conditions of roads being erroneously detected.

SUMMARY OF THE INVENTION

One object of the present invention is to provide a road surface detecting device capable of accurately detecting conditions of a road surface without being affected by the running speed of a vehicle and the variation of tire air pressure.

Another object of the present invention is to provide a road surface detecting device free from erroneous decision of partially uneven portions on good roads as bad road conditions.

The road surface detecting device according to the present invention comprises means for detecting instantaneous speeds of a wheel of a vehicle at regular time intervals, means for calculating a presumed speed from a plurality of instantaneous speeds, means for calculating an absolute value of a difference between the instantaneous speeds and the presumed speed, and means for statistically processing the absolute value of the difference, deciding a road surface condition as a bad condition when the statistically processed value is not less than a predetermined value, and deciding a road surface condition as a good condition when said statistically processed value is not more than the predetermined value.

The detecting device having the above described construction, the absolute value of the difference between the instantaneous speed of vehicle and the presumed speed of vehicle is used for detecting the condition of the road surface. This results in the device of the present invention being free from the erroneous detection of the road condition due to the change of tire air pressure and vehicle running speed. Furthermore, according to the present invention, the condition of the road surface is decided based on the statistically processed value of the absolute value of the above described difference. Therefore, erroneous detection of partially uneven portions on a good road as a bad road condition can be prevented.

DETAILED DESCRIPTION OF THE EMBODIMENTS

Hereinafter, the present invention will be explained in accordance with one embodiment with reference to the drawings.

Figure 1:
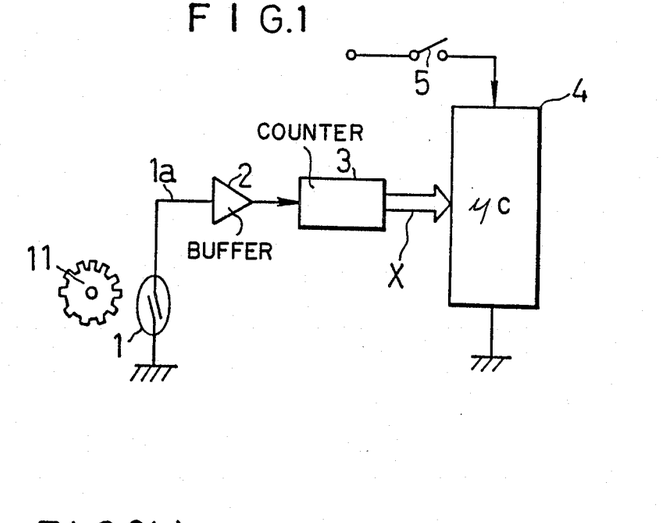
FIG. 1 is a view illustrating a block diagram structure of a road surface detecting device.
Figures 2A, 2B:
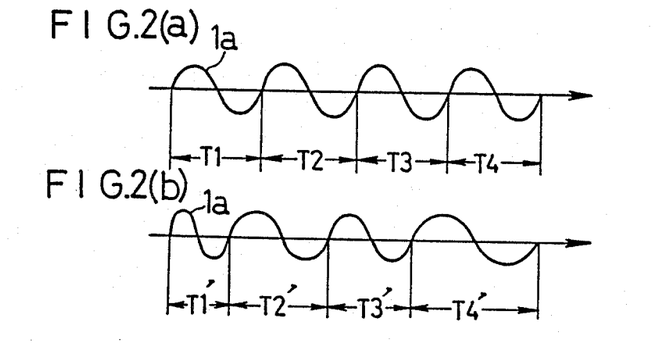
FIG. 2(a) and 2(b) are waveform charts of output signals of a rotary sensor.

FIG. 1 shows the structure of a device according to the present invention. In FIG. 1, a reference numeral 1 denotes a rotary sensor installed in each of wheels, a reference numeral 2 denotes a buffer amplifier, a reference numeral 3 denotes a counter, a reference numeral 4 denotes a microcomputer, and a reference numeral 5 denotes a key switch. A circular plate 11 having a large number (72 in this embodiment) of teeth on the outer periphery thereof at equal distances, is secured to an axle so as to be integrally rotated therewith. The rotary sensor 1 is disposed to detect the passage of the teeth. The waveform of an output signal 1a of the rotary sensor 1 is shown in FIGS. 2(a) and 2(b). FIG. 2(a) illustrates the signal waveform on a good road. FIG. 2(a) periods T1, T2, T3, and T4 which have very short variances. From this it can be known that the variation of speed of the wheels is small. In contrast, in the signal waveform on a bad road illustrated in FIG. 2(b), the periods T1', T2', T3', and T4' vary largely and the resultant variation of speed of wheels are large.

The output signal 1a of the rotary sensor 1 is transformed into a rectangular wave by means of the buffer amplifier 2 and is inputted into the counter 3. The counter 3 is set so as to count clock pulses inputted from the rising time of one rectangular wave to the rising time of the next rectangular wave, and outputs period data X which is proportional to the period T of the output signal 1a. The period data X is inputted into the microcomputer 4 and the microcomputer 4 characterizes the road surface condition as described later. The microcomputer 4 is connected to a battery(not shown) through the key switch 5 and operates only when the key switch 5 is turned on.

Figure 3A:
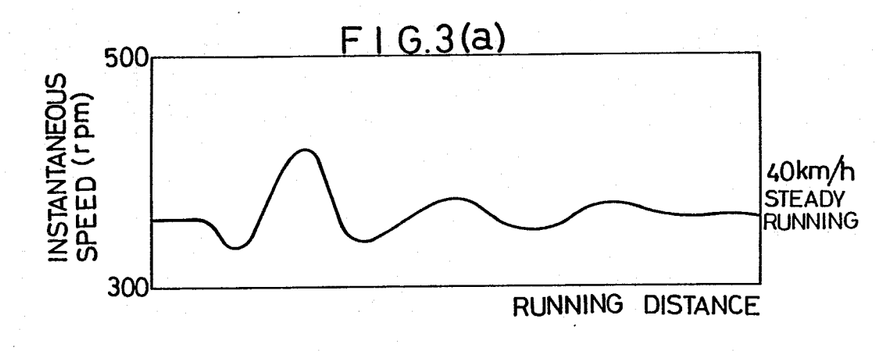
FIG. 3(a), 3(b), 3(c) and 3(d) are waveform charts, each illustrating the variation of instantaneous speed when the tires of a vehicle run over uneven portions of a road.
Figure 3B:
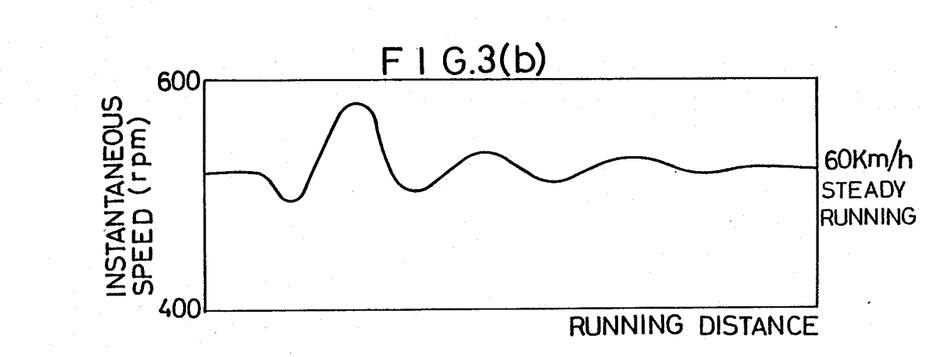
Figure 3C:
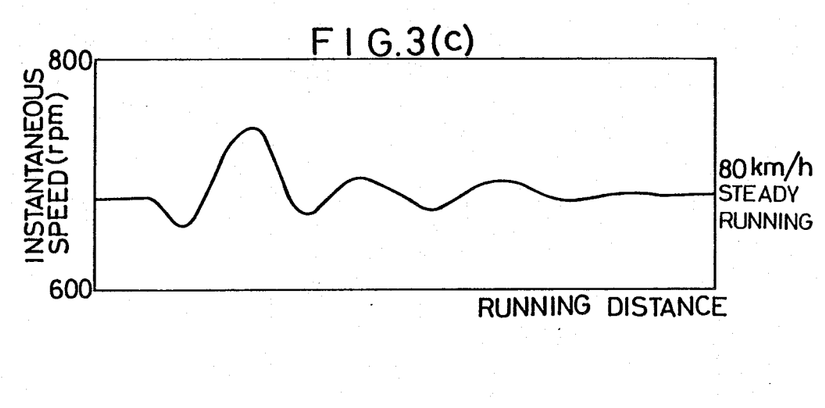
Figure 3D:
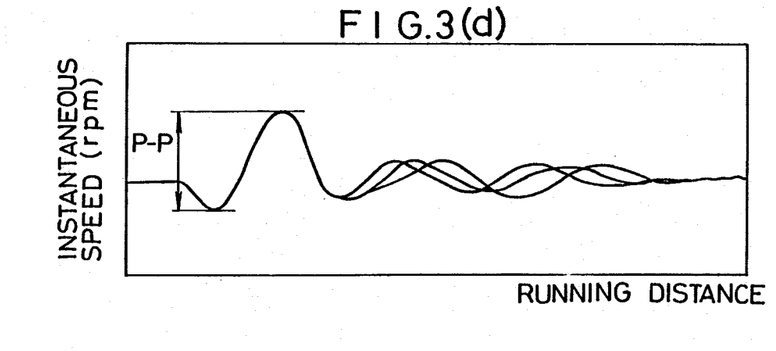

The variations of instantaneous speed of wheels running over the same projection at the same tire air pressure and different vehicle speeds are shown in FIGS. 3(a), 3(b), 3(c). FIGS. 3(a), 3(b) and 3(c) show the variations of instantaneous speed when constantly running at 40 km/h, 60 km/h and 80 km/h, respectively. By superposing these waveforms shown in FIGS. 3(a), 3(b) and 3(c) on one another, the waveform shown in FIG. 3(d) is obtained. By detecting the P—P value (the value between the maximum peak value and the minimum peak value) of this waveform, the degree of projection and unevenness of roads can be detected without being affected by the variation of speed.

Figure 4:
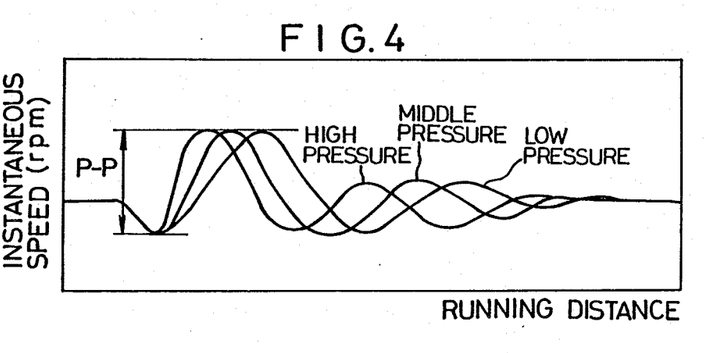
FIG. 4 is a waveform chart illustrating the variation of instantaneous speed when tires run over uneven portions of a road relative to the variation of air pressure of tires.

The variation of instantaneous speed of wheels when running on the same projection at the same speed and different tire air pressures is shown in FIG. 4. From the result of FIG. 4 it is clear that the degree of unevenness of road surface can be detected from the P—P value without being affected by the variation of air pressure.

From the foregoing, the present inventors have found to detect the condition of road surface without being affected by the vehicle speed and the tire air pressure by detecting the P—P value of the instantaneous speed of wheels.

Figure 5:
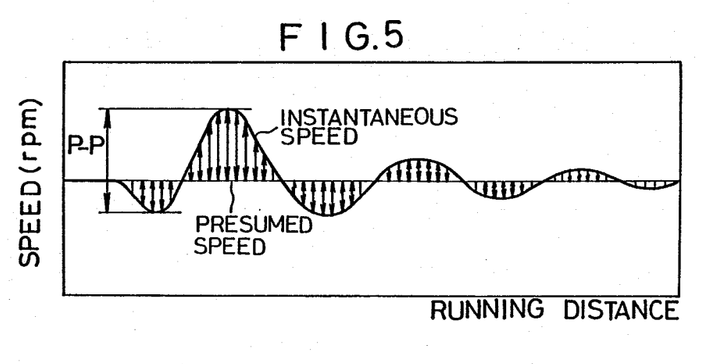
FIG. 5 is a waveform chart illustrating the variation of instantaneous speed and presumed speed when tires run over uneven portions of a road.

Hereinafter, the detecting method of this P—P value will be explained. It is difficult to actually detect the P—P value in realtime. Therefore, an imaginary speed(presumed speed) is set and the actual speed(instantaneous speed) is relative compared with the presumed speed at every instant to obtain a difference therebetween (an absolute value) as shown in FIG. 5. The setting of the presumed speed is based on the idea that a vehicle body continues at a constant speed motion because of its large inertia, while the wheels continue at speeds which are not constant due to road surface load variation because of their small inertia. The obtained difference changes in accordance with the change of P—P value, but is not affected by the vehicle speed and the air pressure of tires. Furthermore, this difference can be easily obtained in realtime. Therefore, by determining the road surface condition from the difference between the presumed speed and the instantaneous speed, the degree of unevenness on the road surface can be easily detected irrespective of the vehicle speed or the like.

Hereinafter, the method for obtaining the presumed speed will be explained.

Figure 6:
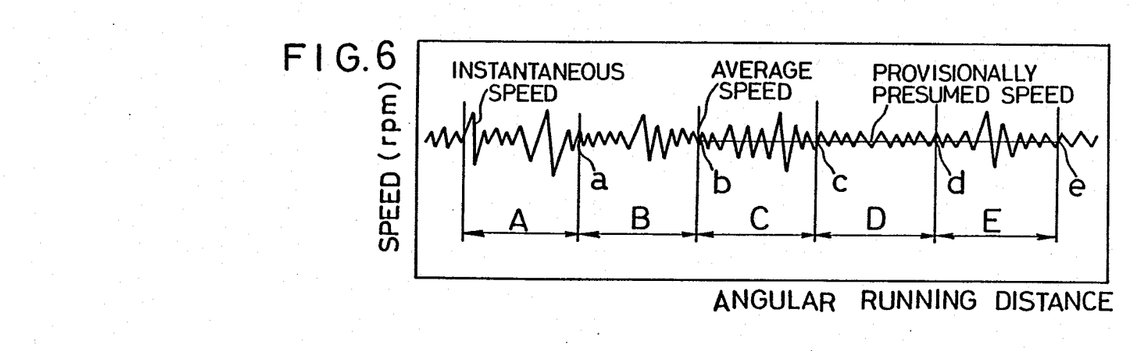
FIG. 6 is a diagram showing the method for obtaining a provisional presumed speed from a past instantaneous speed.

As shown in FIG. 6, the average speed over the interval A is "a" and the average speed over the interval B is "b". The average speeds a and b are obtained by averaging the instantaneous speeds over each interval. From the above fact, the rotating speed over the interval C is provisionally presumed by an extension of a-b. Similarly, the rotating speed over the interval D is provisionally presumed by an extension of b-c. In the intervals such as A, B and C, an output signal of the sensor 1, corresponding to at least one rotation of each wheel is required for obtaining a stable provisional presumed speed while a vehicle normally runs. The reasons are as follows. At first, a periodic wave may occur in every rotation (360°) of each wheel due to the working precision of teeth of the sensor 1. For cancelling such a periodic wave, the interval not less than 360° is required. Secondly, when a vehicle runs over joints or the like while normally running, the interval not less than 360° is required for preventing the presumed speed from being affected by the joints or the like(In the present embodiment, 72 teeth are formed around the sensor 1 at regular intervals).

In contrast, when the vehicle is decelerated, it is preferable to shorten the length of the above described interval. For the above reasons, the length of the interval is set to 360° which corresponds to one rotation of each wheel.

Figure 7:
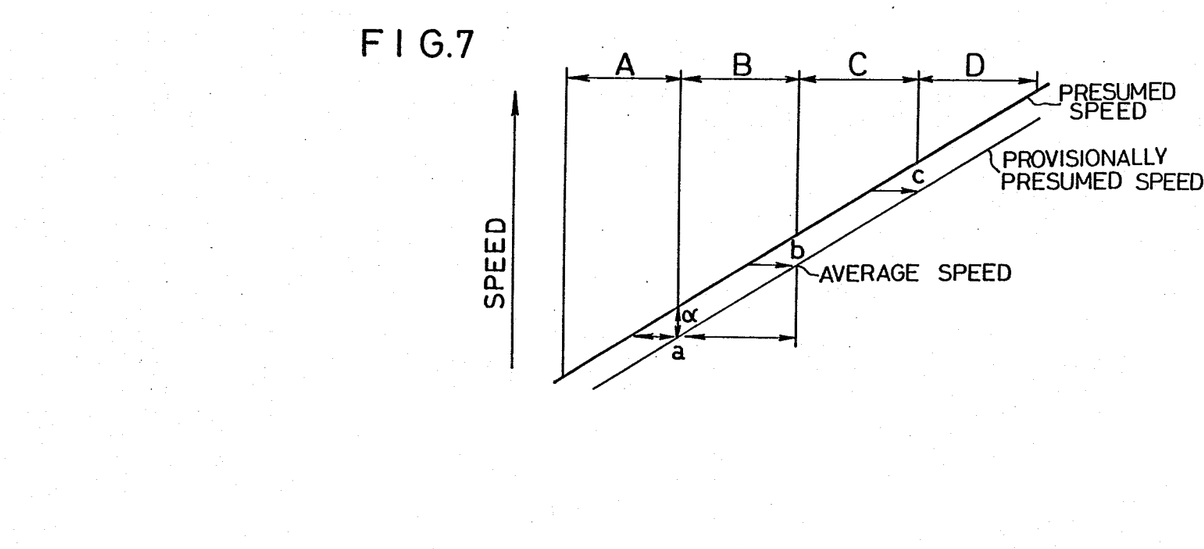
FIG. 7 is a diagram showing the method for obtaining a formal presumed speed by correcting the provisional presumed speed.

FIG. 7 shows the instantaneous speed and the provisionally presumed speed when the vehicle is accelerated. As shown in FIG. 7, a difference occurs between the instantaneous speed and the provisionally presumed speed when the vehicle is accelerated. This difference is cancelled by a correction value $\alpha$. This correction value $\alpha$ is obtained as follows:

$$\alpha = \frac{72-1}{2} \times \frac{1}{72} (b-a) \approx (b-a)/2$$

The provisionally presumed speed is corrected by this correction value $\alpha$ to obtain a formally presumed speed.

By the above described procedure, the presumed speed is obtained and the obtained presumed speed is compared with the instantaneous speed to calculate a difference therebetween. Since this difference corresponds to the road surface condition, the road surface condition is determined based on this difference.

Figure 8:
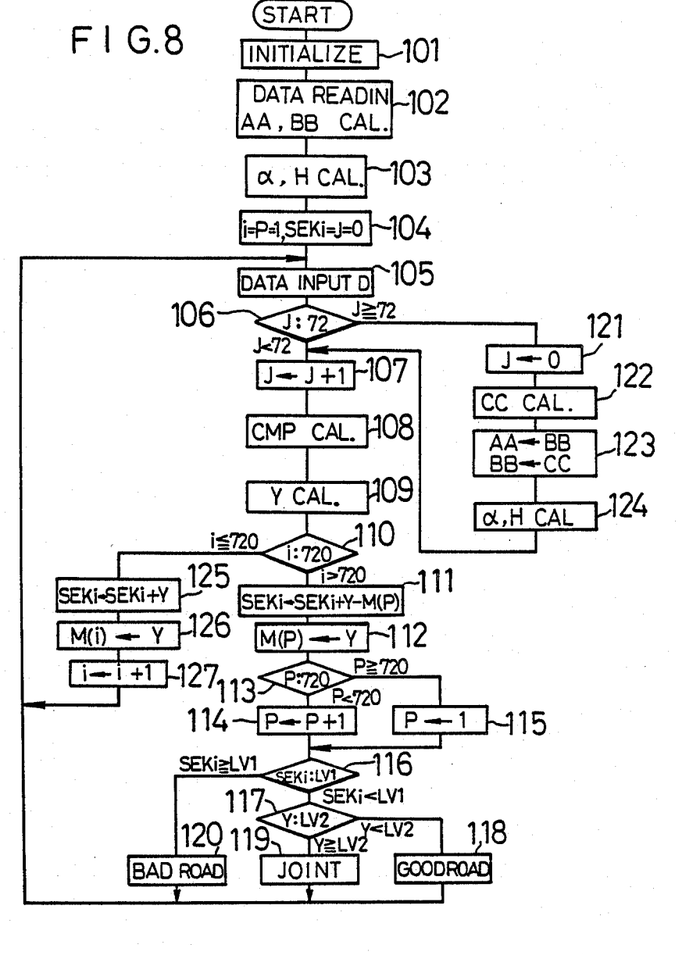
FIG. 8 is a program flowchart of a microcomputer.

Hereinafter, the processing steps of the microcomputer 4 will be explained with reference to FIG. 8.

In the step 101, a memory is initialized and in the step 102, 72 continuous period data X, that is a signal corresponding to one rotation of each wheel are inputted. Then an average value is obtained and rpm conversion is performed to obtain AA. Next, 72 continuous data over the following interval are inputted and an average value thereof is calculated and rpm-converted to obtain BB in a similar manner. In the step 103, an offset value $\alpha$ and a gain value H are obtained from the AA value and the BB value obtained in the step 102 for obtain a presumed speed over the next interval. In this case, the relation between $\alpha$ and H is expressed as follows:

$$\alpha = (BB-AA)/2, H = (BB-AA)/(72-1)$$

In the step 104, memories i, p, SEki, and J are initialized.

In the step 105, one period data X is inputted and the inputted period data X is rpm-converted to obtain an instantaneous speed D. In the step 106, the decision whether the number of data inputted in the step 105 is 72 or not, namely the output signal from the sensor 1 corresponds to one rotation or not is performed by means of a flag J. When the output signal from the sensor 1 does not correspond to one rotation thereof, counting operation is performed by the flag J in the step 107, and when the output signal from the sensor 1 corresponds to one rotation thereof, the flag J is cleared in the step 121. And in the step 122 an average value of previously inputted 72 continuous data is obtained and is rpm-converted to obtain CC. In the step 123, AA is updated to BB and BB is updated to CC. Then, in the step 124, operations similar to the step 103 are executed and proceeds to the step 107.

In the step 107, counting operation is executed by means of the flag J, and in the step 108, a presumed speed CMP is calculated. In this case, CMP is expressed as follows:

$$CMP = BB + a + J \times H$$

In the step 109, the presumed speed CMP is relatively compared with the instantaneous speed D to obtain a difference therebetween Y. In this case, Y is expressed as follows:

$$Y = |D - CMP|$$

In the step 110, the checking operation whether the sensor 1 rotates by 10 rotations or not is executed by means of a flag i. When not, an integrated value SEKi of the difference Y is obtained in the step 125. In this case, SEKi is expressed as follows:

$$SEKi = SEKi + Y$$

In the step 126, the difference Y is stored in addressed memroy M(i)(i=1~720) and in the step 127, the flag i is counted and i of the addressed memory M(i) is decided to return to the step 105.

When the sensor 1 is rotated 10 times upon checking in the step 110, the differences Y in the past 10 rotations are integrated in the step 111. Namely, to the preceding difference integrated value SEKi is added a newest difference Y and the oldest difference M(p)(p=1~720) is subtracted from the added value to obtain a successive difference integrated value of the past ten rotations of each wheel. In this case, the successive difference integrated value is expressed as follows:

$$SEKi = SEKi + Y - M(p)$$

In the step 112, the newest difference Y is stored in the memory M(p) which memories the oldest difference to prepare following steps.

In the steps 113 to 115, an address of the memory M storing the oldest difference is decided. p denotes the address and cycles from 1 to 720 (corresponding to the number for storing the data of 10 rotations of the sensor 1).

In the step 116, the difference integrated value SEKi calculated in the step 111 is compared with the preset value Lv1. In case of SEKi≧LV1, the road condition is decided as a bad road in the step 120 and in case of SEKi<LV1, the road condition is decided as partially uneven portions on a good road in the step 117. Partially uneven portions on a good road such as joints must be instantaneously decided. Therefore, the difference Y is compared with the preset value LV2. And in case of Y≧LV2, the road condition is decided as joints on a good road in the step 119. And in case of Y<LV2, the road condition is decided as a good road in the step 118 and returns to the step 105.

By repeating the above described steps, the road surface conditions can be precisely detected as a bad road, a good road or a joint. This results in the most appropriate damping force of a suspension can be selected in accordance with the detected road surface condition.

In this case, at the start of a bad road, the road surface condition is decided as joints and when the value of SEKi is increased after a while, the decision as a bad road is executed.

In the above embodiment, when the damping force of the suspension is not changed at joints, it is unnecessary to detect the joints in the step 117.

As described above, the detecting device according to the present invention calculates the presumed speed of a vehicle and obtains a difference between the calculated presumed speed and an instantaneous speed of a wheel. And the detecting device according to the present invention employs this obtained difference in detecting the road surface condition. This results in the detecting device being free from the affection by a large change of air pressure of tires or vehicle speed.

Furthermore, the detecting device according to the present invention judges the road surface condition based on the successive integrated value of the above differences. Therefore, partially uneven portions on a good road is prevented from being erroneously decided as a bad road.

In the above embodiment, the length of the interval over which the successive difference integrated value is calculated(road surface deciding interval) is set as to correspond to 10 rotations of the sensor 1 (the number of data is 720). This road surface deciding interval is not limited to this length and can be set to a voluntary value.

In the above embodiment, the successive difference integrated value is employed. In place of employing this value, following method can be employed. Namely, the decision whether the difference exceeds a predetermined comparision value LV3 or not (whether there are uneven portions on a road surface or not) is executed every time when the difference between the instantaneous speed and the presumed speed is calculated. And the frequency of exceeding LV3, is detected over a constant running distance as the deciding interval. When the frequency is not less than a predetermined frequency, the road surface is decided as a bad road.

In the above embodiment, the presumed speed of a vehicle is calculated based on two average speeds of wheel obtained in two intervals. In addition, a successive average value of instantaneous speeds of wheel may be employed as the presumed speed. In this case, RAM requires such a volume as storing a large number of data as compared with the above embodiment.

In the above embodiment, the decision of the condition of the road surface on which each wheel runs can be performed based on the rotary sensor provided in each wheel. Therefore, even when a left wheel runs on a bad road surface and a right wheel runs on a good road surface, for example, the damping force of the shock absorber of each wheel can be adjusted in accordance with the road condition corresponding to each wheel. In general, the road condition on the side of a center line is good and that on the side of an edge of a road is bad due to stones, pebbles or the like. The above described detecting device capable of independently detecting the road condition on which each wheel runs is profitable in detecting the above described road condition.

When the rotary sensor is not installed in each wheel, the signal from the rotary sensor installed in at least one wheel is employed as a representative signal, and from this signal may be decided the road condition. In this case, it is preferable to install the rotary sensor in non-driving wheels or front wheels. The reason why it is preferable to install the rotary sensor is installed in the non-driving wheels is that the rotating speed of the driving wheels largely changes since the driving force of engine is directly transmitted thereto and that the driving wheels often race on bad roads or the like. And the reason why it is preferable to install the rotary sensor in the front wheels is that the front wheels run over uneven portions on a road surface prior to the rear wheels.

What is claimed is:

1. A road surface detecting device comprising:
   means for detecting instantaneous speeds of a wheel at regular intervals;
   means for calculating a presumed speed of a vehicle from said instantaneous speeds;
   means for calculating absolute values of differences between the subsequent instantaneous speeds of said wheel and said presumed speed of said vehicle; and
   means for comparing said absolute values of said differences with a predetermined value and generating a bad road signal indicating that said vehicle is running on a rough road when said absolute values of said differences are not less than said predetermined value.

2. A road surface detecting device according to claim 1, wherein said means for detecting instantaneous speeds is provided with a circular plate connected to an axle of a vehicle so as to be rotated therewith, which has a large number of teeth at regular intervals on its outer periphery, a sensor for detecting the passage of said teeth and generating a pulse signal, and a calculating means for calculating said instantaneous speeds from the period of said pulse signal.

3. A road surface detecting device according to claim 1, wherein said means for calculating said presumed speed calculates one average value of a plurality of instantaneous speeds obtained at a predetermined rotation of wheel, calculates another average value of a plurality of instantaneous speeds obtained at the following predetermined rotation of said wheel, and calculates said presumed speed based on said one average value and said another average value.

4. A road surface detecting device according to claim 1, wherein said means for calculating said presumed speed cancels an oldest instantaneous speed every time a newest instantaneous speed is obtained, calculates successive average values of a predetermined number of said instantaneous speeds and calculates said presumed speed based on said successive average values.

5. A road surface detecting device according to claim 1, further comprising
   means for integrating said absolute values of said differences for a predetermined time to obtain an integrated value; and
   means for comparing said integrated value with a predetermined value and determining said road to be a bad condition when said integrated value is not less than the predetermined value, and to be a good condition when said integrated value is not more than the predetermined value.

6. A road surface detecting device according to claim 3, further comprising means for correcting said presumed speed by a gain value and an offset value, each being obtained from said one average value and said another average value.

7. A road surface detecting device according to claim 3, wherein each of said one average value and said another average value are calculated from a plurality of instantaneous speeds obtained over one rotation of said wheel.

8. A road surface detecting device for a vehicle, comprising:
   means for detecting instantaneous speeds of a wheel at regular intervals;
   means for calculating a presumed speed of a vehicle from said instantaneous speeds;
   means for calculating absolute values of differences between the subsequent instantaneous speeds of said wheel and said presumed speed of said vehicle; and
   means for statistically processing said absolute values of said differences to obtain a statistical value and determining a road surface condition to be a bad condition when said statistical value is not less than a predetermined value, and to be a condition when said statistical value is not more than the predetermined value.

9. A road surface detecting device according to claim 8, wherein said processing means cancels an absolute value of an oldest one of said differences every time an absolute value of a newest one of said differences is obtained, calculates a successive integrated value by adding a predetermined number of absolute values of said differences, and determines said road surface condition as a bad condition when said successive integrated value is not less than a predetermined value and as a good condition when said successive integrated value is not more than the predetermined value.

10. A road surface detecting device according to claim 8, wherein said processing means detects a number of times a current one of said absolute values is greater than said differences by a predetermined amount, in a predetermined running distance, and determines said road surface condition to be a bad condition when said number is not less than a predetermined number, and as a good condition when said number is not more than a predetermined number.

11. A road surface detecting device according to claim 8, wherein said processing means determines a road surface condition to be a partial unevenness on a good road when said statistical value is not more than a predetermined value and said absolute value of a newest one of said differences is not less than another predetermined value.

12. A road surface detecting device for a vehicle having a wheel, comprising:
   sensor means, adapted to be mounted on the wheel of said vehicle, for generating a wheel signal indicative of a revolution of the wheel;
   means for calculating instantaneous wheel speeds based on said wheel signal;
   means for calculating a presumed speed of said vehicle by averaging said instantaneous wheel speeds during a predetermined period of time;
   means for generating an absolute difference signal by comparing a subsequent instantaneous wheel speed with the presumed vehicle speed; and
   means for comparing said absolute difference signal by comparing a subsequent instantaneous wheel spaced with the presumed vehicle speed; and
   means for comparing said absolute difference signal with a predetermined value and generating a bad road signal indicating that said vehicle is running on a rough road when said absolute difference signal is not less than a predetermined value.

13. A road surface detecting device for a vehicle having a wheel, comprising:
- sensor means adapted to be mounted on the wheel of said vehicle, for generating a wheel signal indicative of a revolution of the wheel;
- means for calculating instantaneous wheel speeds based on said wheel signal;
- means for calculating a presumed speed of a vehicle by averaging said instantaneous wheel speeds during a predetermined period of time;
- means for generating an absolute difference signal by comparing a subsequent instantaneous wheel speed with the presumed speed;
- means for integrating said absolute difference signal for a predetermined time to obtain an integrated value; and
- means for comparing said integrated value with a predetermined value and determining said road surface to be in a bad condition when said integrated value is not less than the predetermined value.

14. A road surface detecting device for a vehicle, comprising:
- means for detecting instantaneous speeds of a wheel and generating instantaneous speed signals indicative thereof;
- means for calculating an average speed by averaging said instantaneous speeds of said wheel during a predetermined period of time;
- means for comparing a subsequent instantaneous speed with said average speed and generating an absolute difference speed signal indicative thereof: and
- means for comparing said absolute difference speed signal with a predetermined value and generating a bad road signal indicating that said vehicle is running on a rough road when said difference speed exceeds the predetermined value.

* * * * *